(12) United States Patent
Protasov et al.

(10) Patent No.: US 11,204,842 B2
(45) Date of Patent: Dec. 21, 2021

(54) SYSTEM AND METHOD FOR AUTOMATING FORMATION AND EXECUTION OF A BACKUP STRATEGY USING MACHINE LEARNING

(71) Applicant: Acronis International GmbH, Schaffhausen (CH)

(72) Inventors: Stanislav Protasov, Moscow (RU); Serguei Beloussov, Costa del Sol (SG); Dmitry Martynov, Moscow (RU); Sergey Ulasen, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 355 days.

(21) Appl. No.: 16/195,915

(22) Filed: Nov. 20, 2018

(65) Prior Publication Data

US 2019/0155695 A1 May 23, 2019

Related U.S. Application Data

(60) Provisional application No. 62/589,620, filed on Nov. 22, 2017.

(51) Int. Cl.
| | |
|---|---|
| *G06F 11/14* | (2006.01) |
| *G06F 16/11* | (2019.01) |
| *G06F 3/06* | (2006.01) |
| *G06F 3/08* | (2006.01) |
| *G06N 20/00* | (2019.01) |
| *G06N 3/08* | (2006.01) |

(52) U.S. Cl.
CPC ........ *G06F 11/1451* (2013.01); *G06F 3/0604* (2013.01); *G06F 3/065* (2013.01); *G06F 3/067* (2013.01); *G06F 3/0643* (2013.01); *G06F 11/1461* (2013.01); *G06N 3/08* (2013.01); *G06N 20/00* (2019.01); *G06F 16/122* (2019.01)

(58) Field of Classification Search
CPC ............. G06F 11/1451; G06F 11/1461; G06F 16/122; G06F 3/0643; G06F 3/0604; G06F 3/067; G06F 3/065; G06N 20/00; G06N 3/08
See application file for complete search history.

(56) References Cited

U.S. PATENT DOCUMENTS

| | | | | |
|---|---|---|---|---|
| 9,158,835 | B2* | 10/2015 | Prahlad | G06F 16/2372 |
| 2008/0208929 | A1* | 8/2008 | Phillipi | G06F 11/1451 |
| 2010/0332401 | A1* | 12/2010 | Prahlad | H04L 63/0428 |
| | | | | 705/80 |
| 2012/0137372 | A1* | 5/2012 | Shin | G06F 21/6209 |
| | | | | 726/26 |

(Continued)

*Primary Examiner* — Dennis Truong
(74) *Attorney, Agent, or Firm* — Arent Fox LLP; Michael Fainberg

(57) ABSTRACT

Disclosed herein are systems and method for forming and executing a backup strategy. In one aspect, an exemplary method comprises, for each file of files from one or more data sources that is being evaluated to form the backup strategy for the file, updating a frequency database, evaluating a uniqueness for the file stored at a data source of the one or more data sources by comparing at least a portion of data of the file to the frequency database, categorizing the file into a hierarchy of logical types according to properties of the file, and forming the backup strategy for the file according to the uniqueness and categorization of the file.

15 Claims, 5 Drawing Sheets

(56) References Cited

U.S. PATENT DOCUMENTS

| | | | |
|---|---|---|---|
| 2012/0233417 A1* | 9/2012 | Kalach | G06F 3/0641 |
| | | | 711/162 |
| 2014/0059311 A1* | 2/2014 | Oberhofer | G06F 11/1461 |
| | | | 711/162 |
| 2014/0122435 A1* | 5/2014 | Chavda | G06F 11/1451 |
| | | | 707/645 |
| 2015/0127661 A1* | 5/2015 | Zamir | G06F 16/13 |
| | | | 707/748 |
| 2015/0134899 A1* | 5/2015 | Cudak | G06F 11/1461 |
| | | | 711/112 |
| 2015/0301899 A1* | 10/2015 | Montulli | G06F 11/1469 |
| | | | 714/19 |
| 2017/0139972 A1* | 5/2017 | Kurian | H04L 9/32 |
| 2017/0344618 A1* | 11/2017 | Horowitz | G06F 11/2097 |
| 2018/0018237 A1* | 1/2018 | Morita | G06F 11/1469 |
| 2018/0067813 A1* | 3/2018 | Venkatesh | G06F 11/14 |
| 2018/0189147 A1* | 7/2018 | Banasik | G06F 21/6245 |
| 2019/0004906 A1* | 1/2019 | Shoolman | G06F 16/1805 |
| 2019/0129798 A1* | 5/2019 | Mutha | G06F 11/3034 |

* cited by examiner

SYSTEM AND METHOD FOR AUTOMATING FORMATION AND EXECUTION OF A BACKUP STRATEGY USING MACHINE LEARNING

CROSS-REFERENCE TO RELATED APPLICATIONS

The application claims priority to U.S. Provisional Patent Application No. 62/589,620, which was filed on Nov. 22, 2017, the contents of which are incorporated herein by reference.

FIELD OF TECHNOLOGY

The present disclosure relates generally to the field of data archiving, and more specifically, to systems and methods for automating formation and execution of a backup strategy using machine learning.

BACKGROUND

Performing regular backup of large amounts of data is a time and power intensive operation. Additionally, a significant amount of storage space, whether locally or in cloud storage, is normally required to complete such large backup operations. This has led to the implementation of backup plans which optimize the performance of the backups. Often, such backup plans take into account backup parameters such as the periodicity of creation of backup copies, whether full or incremental, the timing of the beginning of the backup operation, the location of the source data, the backup location, whether local storage, cloud storage or instant copy, and finally, whether the data requires encryption based on the confidentiality of data contained therein.

However, the backup operation may be for large volumes of data from various sources with varying file types. Moreover, the data can change very quickly and often. Modifying the parameters described above becomes unwieldy and ineffective without considering alternative strategies.

Therefore, there is a need for a an efficient and flexible method and system for forming and executing backup strategies, e.g., for backing up large volumes of dynamic data from various sources and file types.

SUMMARY

Aspects of the disclosure relate to forming and executing backup strategies for files using machine learning.

In one exemplary aspect, a method for forming and executing a backup strategy is implemented in a system that comprises a data analysis engine and a learning engine, the system comprising one or more processors, the method comprising: for each file of files from one or more data sources that is being evaluated to form the backup strategy for the file, updating a frequency database, evaluating a uniqueness for the file stored at a data source of the one or more data sources by comparing at least a portion of data of the file to the frequency database, categorizing the file into a hierarchy of logical types according to properties of the file, and forming the backup strategy for the file according to the uniqueness and categorization of the file.

According to one aspect of the disclosure, a system is provided for forming and executing a backup strategy, the system comprising at least one processor configured to: for each file of files from one or more data sources that is being evaluated to form the backup strategy for the file, update a frequency database, evaluate a uniqueness for the file stored at a data source of the one or more data sources by comparing at least a portion of data of the file to the frequency database, categorize the file into a hierarchy of logical types according to properties of the file, and form the backup strategy for the file according to the uniqueness and categorization of the file.

In one exemplary aspect, a non-transitory computer-readable medium is provided storing a set of executable instructions thereon for forming and executing a backup strategy, including instructions for: for each file of files from one or more data sources that is being evaluated to form the backup strategy for the file, updating a frequency database, evaluating a uniqueness for the file stored at a data source of the one or more data sources by comparing at least a portion of data of the file to the frequency database, categorizing the file into a hierarchy of logical types according to properties of the file, and forming the backup strategy for the file according to the uniqueness and categorization of the file.

In one aspect, the categorizing of the file further comprises: analyzing metadata associated with the file, analyzing contents of the file, and classifying the file based on the metadata associated with the file and the contents of the file.

In one aspect, the method further comprises: adding a secure backup strategy to the backup strategy for the file, when the uniqueness or importance of the portion of data is determined as being greater than a respective predetermined uniqueness or importance threshold, adding an instant copying to the backup strategy for the file, when the file is determined as having a desired recovery time less than a predetermined recovery time threshold, adding a distributed backup to the backup strategy for the file, when a criticality of data loss associated with the portion of data is higher than a predetermined criticality threshold, adding a local backup to the backup strategy for the file, when the criticality of data loss associated with the portion of data is lower than the predetermined criticality threshold, copying the file to a cloud storage, when the instant copying is added to the backup strategy, and executing the backup strategy for the file.

In one aspect, the method further comprises: evaluating a confidentiality of a file prior to forming the backup strategy, the evaluation being to determine whether the file is confidential and, when the file is confidential, to determine a degree of confidentiality, and selecting a strength of one or more encryption algorithms according to the determined degree of confidentiality.

In one aspect, the backup strategy comprises one or more of: an instant copy, a local copy, and a cloud storage.

In one aspect, the backup strategy is further formed according to one or more of: an importance, a recovery time, and a recovery point objective of the file.

In one aspect, the uniqueness is evaluated based on a deep learning analysis of one of: a local data set and an external data set. In one aspect, the local data set comprises an archive and the external data set comprises the Internet.

In one aspect, the evaluation of the uniqueness based on the deep learning comprises one or more of: considering an authorship of the file and availability of the file in the local and external data sets, considering metadata regarding a location of the file in combination with the authorship of the file, and considering an availability of the file in the local and external data sets.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method and computer program product for automating formation and execution of a backup strategy using machine learning. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Exemplary aspects of the present disclosure use deep learning algorithms to optimize and automate formation and execution of backup strategies for data endpoints.

Figure 1:
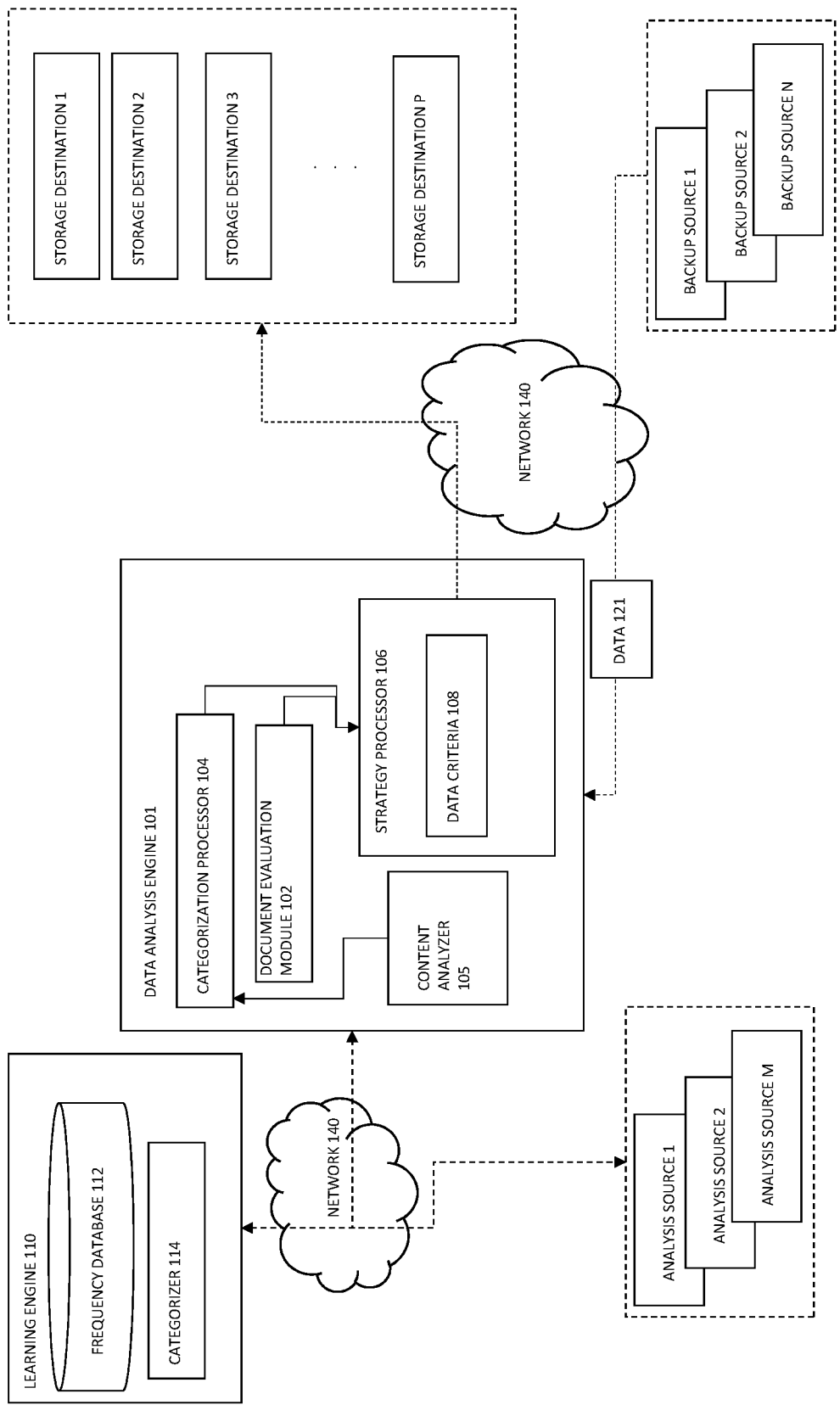
FIG. 1 is a block diagram illustrating a system for automating the formation and execution of a backup plan according to an exemplary aspect of the disclosure.

FIG. 1 is a block diagram illustrating a system 100 for automating a formation and execution of a backup plan according to an exemplary aspect of the disclosure. The system 100 comprises a data analysis engine 101, a learning engine 110, one or more backup sources 1 to N (or alternatively referred to as "endpoints"), one or more analysis sources 1 to M and one or more storage destinations 1 to P. The data analysis engine 101 comprises a document evaluation module 102, a categorization processor 104, a content analyzer 105 and a strategy processor 106. Aspects of this disclosure do not limit the network location of the data analysis engine 101 relative to the storage destinations 1 to P, the backup sources 1 to N or the analysis sources 1 to M.

The data analysis engine 101 performs backup operations on data 121 from one or more of the backup sources 1 to N. The backup sources 1 to N may be one or more storage devices local to computing workstations, server storage devices, or any other device storage contemplated by one of ordinary skill in the art. The data contained in the backup sources 1 to N comprises, in some aspects, database files, personal files, files associated with software applications or the like. The data stored in the backup sources 1 to N is not limited to those types described in this disclosure and may contain any types of files which a person or enterprise may desire to have backed up. The data analysis engine 101 may be directly coupled to the backup sources 1 to N, e.g. on the same local area network (LAN), may communicatively couple to the backup sources 1 to N over network 140, or a combination of both.

The data analysis engine 101 performs stores backups of the data 121 in one or more of the storage destinations 1 to P. The storage destinations 1 to P are distinct storage types. In one aspect, the storage destination 1 is an "Instant Copy" destination, the storage destination 2 is a local copy destination and the storage destination 3 is a remote cloud storage destination. In the example of a local copy destination, the storage destination 2 is located local to the backup source. In aspects of the disclosure, local destinations can be external drives, network shares, tape drives, though not limited thereto. In this aspect, remote destinations can be any cloud destination. Finally, an instant copy is a way of saving files quickly for short periods of time, generally using RAM or snapshotting techniques. In some aspects of the disclosure, the data analysis engine 101 selects a combination of storage destinations, for example, instant copy and local copy, local copy and cloud copy, and any other combination thereof deemed appropriate by the data analysis engine 101 given properties of the data.

In one aspect, the data analysis engine 101 is also communicatively coupled to the learning engine 110 via network 140 or via some other communicative configuration. The learning engine 110 comprises a frequency database 112 and a categorizer 114. The learning engine 110 is further configured to communicate with analysis sources 1, 2 . . . M. The analysis sources are used by the learning engine 110 as deep learning sources used to classify and categorize any data that passes through system 100. In one aspect, the analysis sources comprise the Internet, data archives, or previously backed up data. The learning engine 110 performs deep learning on the analysis sources 1 to M to recognize and classify data efficiently and accurately as the data changes over time. For example, the frequency database 112 inspects the Internet as an analysis source and creates hashes of all documents (e.g., including but not limited to: ACROBAT® PDF, WORD®, POWERPOINT®) that are globally available. The frequency database 112 associates these hashes with the commonality and availability of the document for future use by the data analysis engine 101. The learning engine 110 also performs machine learning on these documents in analysis sources 1 to M and classifies the types of documents according to, at least, importance of data, recovery time, recovery point objective and data confidentiality. Importance of data relates to the availability of the document. Recovery Point Objective (RPO) refers to a maximum targeted period of time in which data might be lost from a service due to a major incident, while recovery time refers to how soon a document may be needed from backup. Finally, confidentiality refers to the level of secrecy or public availability of the document.

The data analysis engine 101 reviews and analyzes data to be backed up from the backup sources 1 to N. The data 121 is categorized using the categorization processor 104 to determine the hierarchical nature of the data. In one aspect, the hierarchical nature of the data comprises the file types such as databases, documents, media files and the like. The data is also classified into types, e.g., curriculum vitae, presentations, reports, user manuals and the like, and sub-types: such as certain products (e.g., "Software 1", "Software 2"), language, region and version. In one aspect, older versions of a document are rated as less important compared with newer versions of the same document. This classification is obtained by the categorization processor 104 passing the data along to the learning engine 110. The categorizer 114 of the learning engine 110 is initially seeded with a few hierarchical rules, and subsequently performs categorization/learning on files from the analysis sources 1 to M and thus can compare the data from the backup sources 1 to N with already categorized data to match the hierarchical structure of the file or the type of the file, and enhance the rules by the new data. Once the data matches data in the categorizer 114, the categorizer 114 returns the hierarchical category of the matched data to the categorization processor 104. In other embodiments, the data stored on backup sources 1 to N is automatically and periodically categorized into hierarchies by the categorizer 114 of the learning engine 110 reflecting any changes that have occurred in the data 121. According to one aspect of the present disclosure, classification of data is based on the analysis of document metadata in the data 121, as well as analysis of titles and contents of the data extracted by the content analyzer 105 (e.g., a semantic analysis, or keyword indexing). Using a keyword index allows categorization to be more efficient.

The document evaluation module 102 is also invoked by the data analysis engine 101 to evaluate each file and determine a uniqueness (e.g., frequency of occurrence) and importance of individual files in the data 121 by passing comparing the data 121 to data stored in the frequency database 112. The learning engine 112 scrapes data from the Internet, data archives, or even backup data to populate the frequency database 112 with a representation of the scraped data. In some embodiments, the representation is a hash of the scraped data, while in other embodiments the data itself is compressed and stored. Commonly available files (those whose count is significantly high in the frequency database 112) are therefore considered less unique by the document evaluation module 102 than files which are not found as often in the frequency database 112.

With the information regarding uniqueness of data from the document evaluation module 102 and the categorization of the data from the categorization processor 104, the data analysis engine 101 invokes the strategy processor 106. The strategy processor 106 forms a backup strategy to use for the particular data based on machine learning, the information received from the processors 102 and 104 (i.e., document evaluation module 102 and categorization processor 104), and a set of data criteria 108. A portion of the data criteria 108 is generated by the strategy processor 106 by considering several aspects of the data 121 such as RPO, confidentiality, document hierarchy and recovery time, discussed in more detail with respect to FIG. 2, based on machine learning performed by the strategy processor 106 to compare the data 121 with data form the learning engine 110. Additionally, the strategy processor 106 considers the confidentiality of the file and may include encryption as a part of the backup strategy if the degree of confidentiality is greater than a particular threshold. In one aspect, the strategy processor 106 forms backup strategies based on similarity of the data being backed up with previously backed-up data and performs machine learning in order to automate selection of the strategy. In other words, the above described rules are known by the strategy processor 106, but these rules are made more precise as the data being backed-up increases. Once a strategy is formed by the strategy processor 106, the strategy processor 106 executes the backup strategy to back up the data to one or more of the storage destinations 1 to P which may be in a local store, in the cloud or an instant copy can be created (e.g., in RAM, as a file snapshot, or both). According to one aspect of the disclosure, the backup strategy formed by the strategy processor 106 ensures optimal data integrity, optimizes the time and resources needed to create backups during a backup window (e.g., the time during which backup operations are performed), and optimize storage space by storing items in different storage destinations according to the their importance, uniqueness, categorization, criticality, and the like and reducing clutter in cloud storage, local storage (e.g., internal or external hard drives) and instant copy storage.

Figure 2:
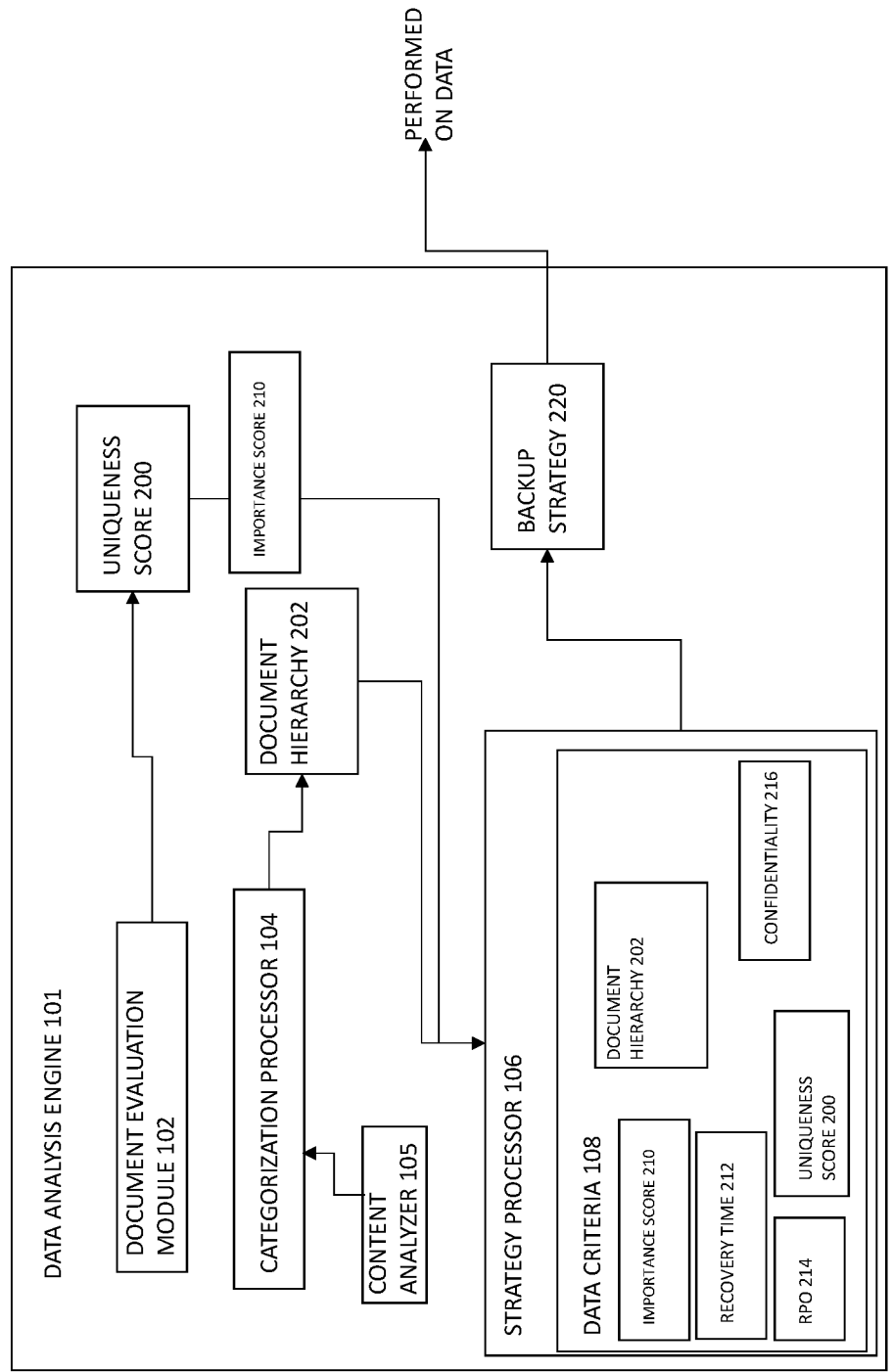
FIG. 2 is a block diagram illustrating example operations of a data analysis engine according to an exemplary aspect of the disclosure.

FIG. 2 is a block diagram illustrating example operations of the data analysis engine 101 according to an exemplary aspect. The data analysis engine 101 invokes the strategy processor 106 taking into consideration the data criteria 108, as illustrated in FIG. 2. The document evaluation module 102 evaluates each document and generates a uniqueness score 200 and an importance score 210. The categorization processor 104 generates a document hierarchy 202. The strategy processor 106 forms data criteria 108 that includes the uniqueness score 200 and the document hierarchy 202, in addition to importance score 210, recovery time 212 and RPO 214. The categorization processor 104 allows for tuning and adjustment of backup plans dynamically. For example, a document that was unique one week ago may no longer be unique because the categorization processor 104 finds the document in several other locations. In another example, a secret finance report with very high importance was updated, so a previous version became less important. Thus the backup strategy changes for this particular document and it can be stored with less redundancy. The RPO 214, confidentiality 216, document hierarchy 202 and recovery time 212 are generated by the strategy processor 106 using machine learning to compare the data 121 being backed up with data form the learning engine 110. In other aspects, over time, based on historical values of the document hierarchy 202, the uniqueness score 200 and the importance score 210, the strategy processor 106 calculates the values of RPO 214, recovery time 212 and confidentiality 216 and becomes more accurate over time in these calculations given more data to process.

The uniqueness score 200 and importance score 210 are related. For example, an electronic book from a well-known publishing house or a user manual that can easily be found on the web is not considered unique and the risk of losing such a document is not relevant. Thus the uniqueness score 200 and the importance score 210 will be comparatively low. While uniqueness and importance are related and complementary, these two scores are theoretically not necessary equal. For example, an author of a document is the same person as a user of a given computer, it is very likely that the document is unique and exists as a single copy. However, this does not mean that the document is extremely important. Additional parameters or characteristics of this document need to be assessed before being considered important, such as the document being marked as "highly confidential", or the like. The unique document becomes more important based on confidentiality (for example), as compared with a simple textual reminder, for example. Another criterion that makes a unique document more or less important is the location of the document. For example, a user stores the document in a folder named "Important" or a folder that can be identified as important in some manner—the importance score 210 will increase. In another example, the importance score 210 will increase when the document is stored in a secure and safe location such as special external drive, for example. Machine Learning is employed by the strategy processor 106 to analyze criteria and forming the uniqueness score 200 and the importance score 210 accordingly. However, the document evaluation module 102 always scores a unique document as more important by default than a non-unique document. If the owner of the computer upon which backup is being performed and the author of the document being inspected are the same person, then such a document is likely unique, relatively increasing the uniqueness score 200 and the importance score 200. Thus importance score 210 and uniqueness score 200 are interrelated, but not necessarily equal. A higher uniqueness score 200 and/or a higher importance score 200 influences the strategy processor 106 to form a secure backup strategy such as, in one aspect, cloud backup, or local backup and cloud backup.

The recovery time 212 represents a desired recovery time for a file. For example, if the recovery time (i.e., the time the file needs to be restored by) 212 is lesser than a predetermined threshold, the strategy processor 212 uses instant copying as a backup strategy. In some aspects, instant copying comprises, but is not limited to, backing the file up in RAM as a file snapshot, or the like. Instant copy is generally used when protecting data from malware, when an unmodified version of a file requires quick saving and quick restoration or the like. Instant copy is generally considered the least reliable way of backing up data and therefore if the importance score 210 or uniqueness score 200 is higher than corresponding threshold values, the backup strategy will include cloud storage in addition to instant copy.

The RPO 214 represents a criticality of data loss for a particular piece of data. If the RPO 214 is lower than a predefined threshold, the strategy processor 106 forms the backup strategy 220 that includes only local storage, such as on an external hard disk. If the RPO 214 is higher than another predefined threshold, the backup strategy 220 comprises cloud storage or another form of distributed storage where redundancy can be chosen, giving an added degree of safety and reliability.

Additionally, the data criteria 108 comprises confidentiality 216 of the data. Depending on the importance of confidentiality of the file, the file may need to be stored in an encrypted form. Accordingly, the confidentiality 216 (e.g., "yes/no") and the degree of this confidentiality is additionally considered by the strategy processor 106, or in other aspects may be combined with the importance score 210. Accordingly, the backup strategy 220 comprises a decision to encrypt the data in the backup process along with choosing the strength of encryption algorithms (e.g. synchronous, asynchronous, etc.).

Accordingly the strategy processor 106 creates a dynamic backup strategy 220 which is configured each time for each new piece of data, based on the deep learning of the learning engine 110 and the data criteria 108. The strategy processor 106 executes the backup strategy 220 on the data, storing the backup in one or more storage destinations 1 to P.

Figure 3:
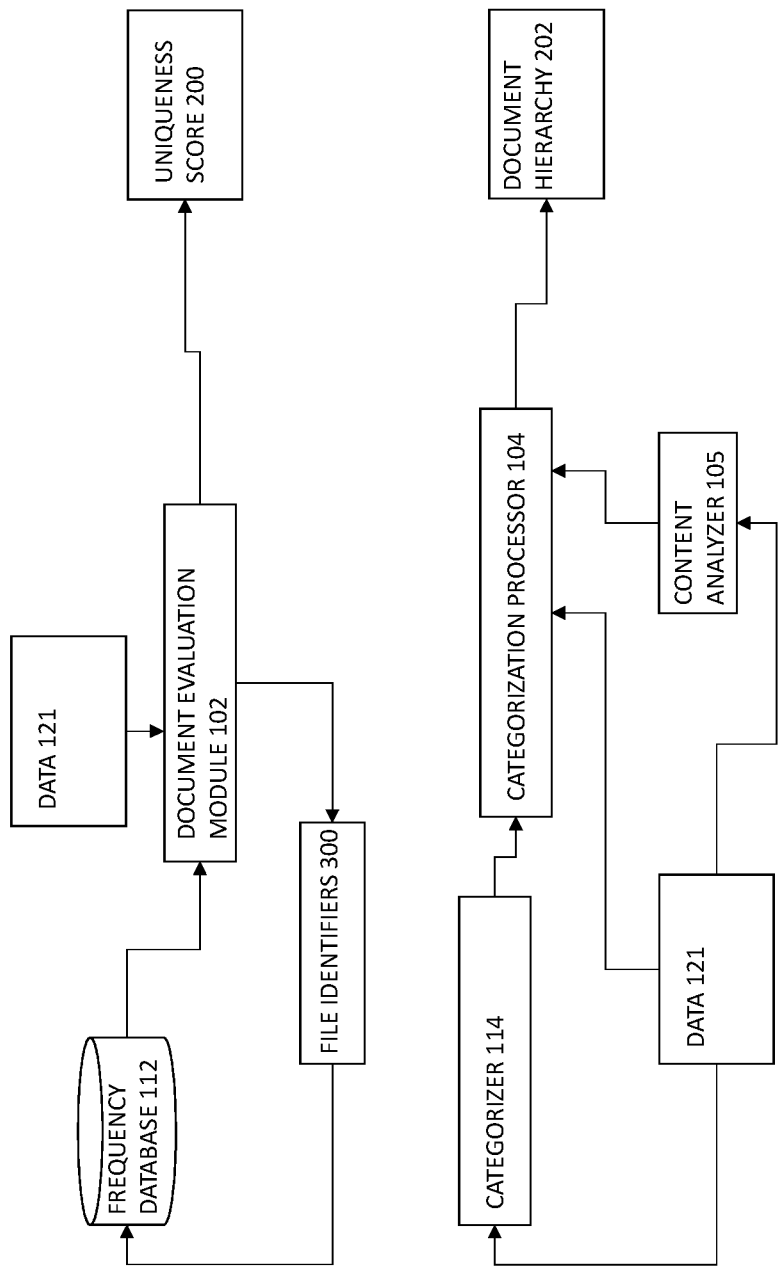
FIG. 3 is a block diagram illustrating example operations of a data classification and categorization stage according to an exemplary aspect of the disclosure.

FIG. 3 is a block diagram illustrating example operations of a data classification and categorization stage according to an exemplary aspect of the present disclosure.

In one aspect of the disclosure, the document evaluation module 102 also parses the data 121 of FIG. 1 and generates a plurality of file identifiers 300 which are stored in the frequency database 112. In this way, the frequency database 112 keeps a record of all files (in addition to other properties associated with those files) that pass through the system 100 so that future data can be evaluated for uniqueness and importance. For a certain file, a file identifier is generated and checked against the frequency database 112. If the database match results in more than a predefined threshold number of results, the uniqueness score 200 is proportionally decreased. If the database match results in fewer than another predefined threshold number of results, the uniqueness 200 score is proportionally increased. In some aspects of the present invention file identifiers 300 comprise hashes of file contents, checksums, or some other identifier calculated using the contents of the file.

In a similar manner, the categorization processor 104 receives data 121 from the backup sources 1 to N. Also, the data 121 passes through a content analyzer 105 which extracts the actual binary or textual data stored in each of the files in data 121. The categorization processor 104 operates on the data 121 itself, and also via the categorizer 114 to categorize the contents of the data into hierarchical structures. Once all of the documents are categorized by the categorizer 114, the categorization processor 104 generates a document hierarchy 202 for use by the strategy processor 106. The document hierarchy 202 includes the type of file, e.g., whether the file is a database file, a media file, a textual document, or the like, in addition to the logical category or subcategory of the file, e.g., whether the file is a presentation, a user manual, a menu, a report, a memo, a curriculum vitae, or the like. With operation of every backup, the learning engine 110 performs deep learning via the frequency database 112 being updated and the categorizer 114 learning about new types of files or similarly between other types of files. This results in future categorizations and determinations of uniqueness to be significantly more accurate.

Figure 4:
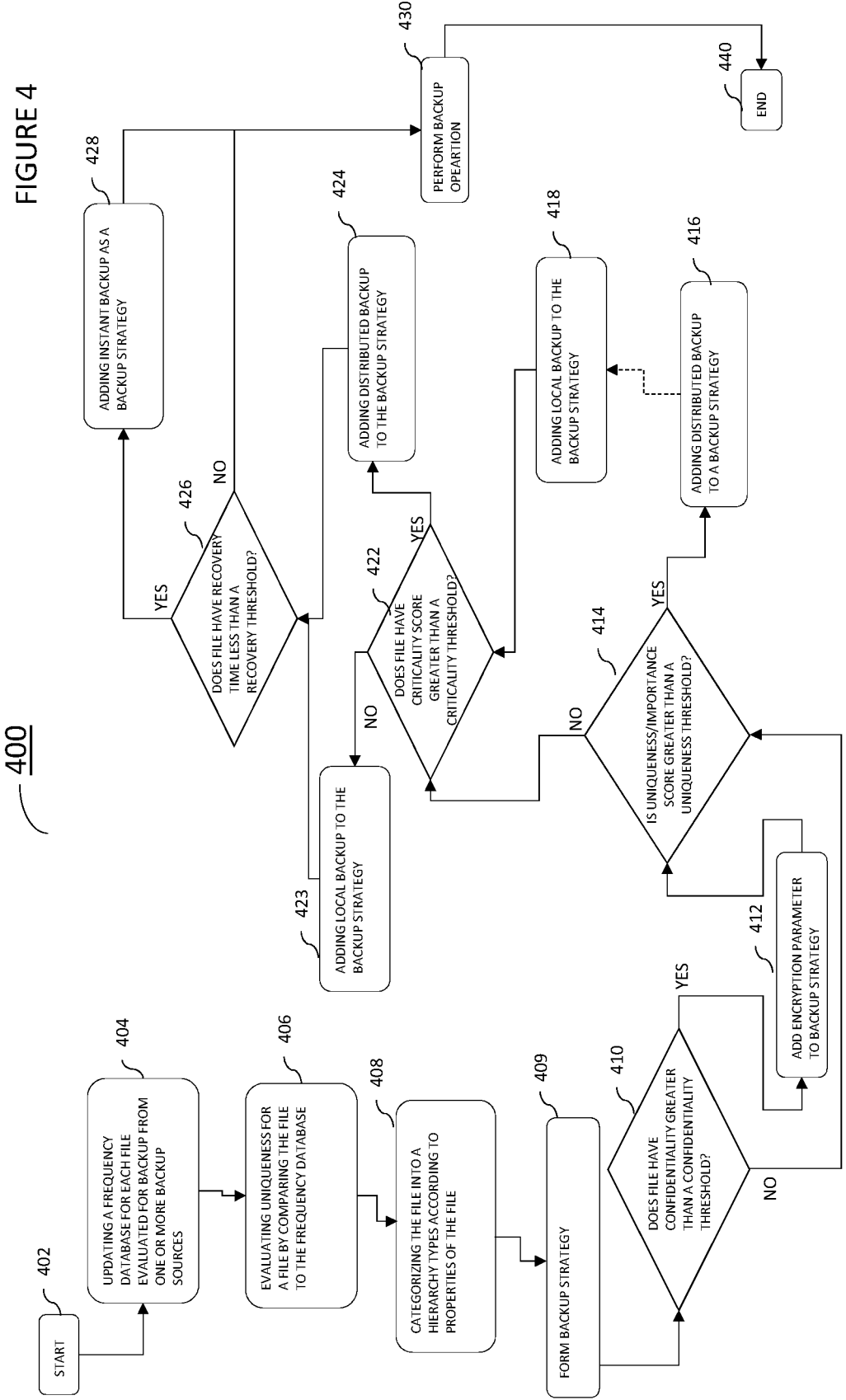
FIG. 4 is a flowchart illustrating a method for automating formation and execution of a backup strategy using machine learning according to an exemplary aspect of the disclosure.
Figure 5:
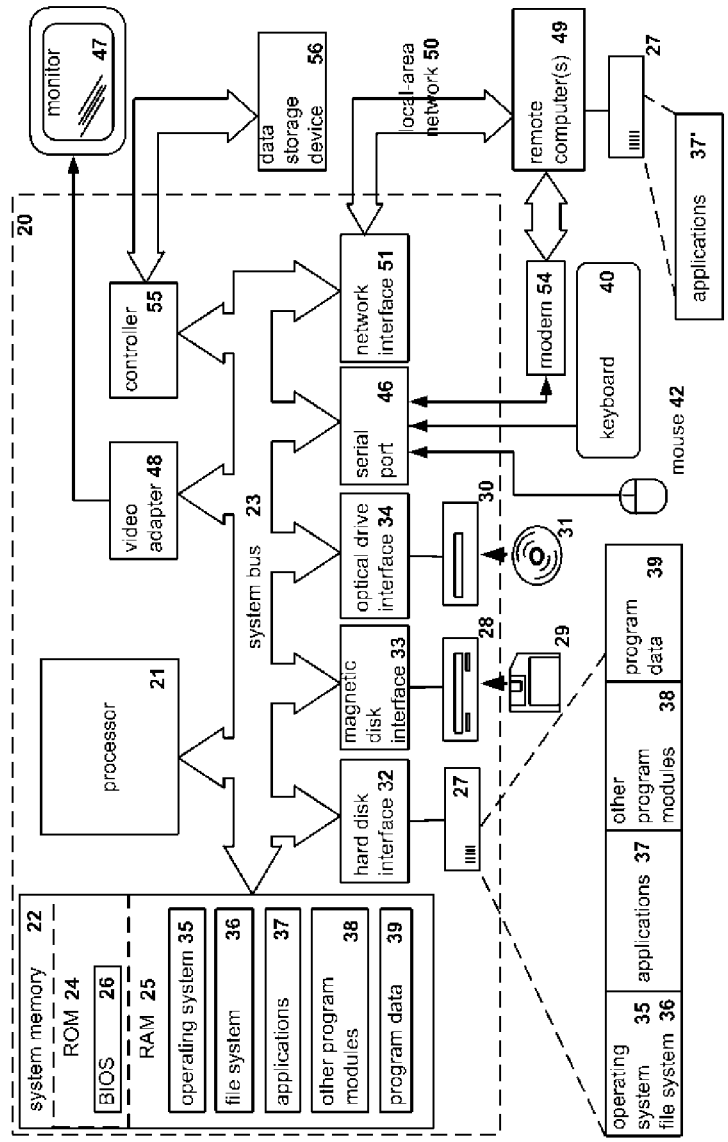
FIG. 5 is a block diagram illustrating an example general-purpose computer system on which the systems and methods may be implemented according to an exemplary aspect of the disclosure.

FIG. 4 is a flowchart illustrating a method 400 for automating formation and execution of a backup strategy using machine learning according to an exemplary aspect of the disclosure. The method of FIG. 4 may be carried out by the data analysis engine 101 and the learning engine 110. The data analysis engine 101 and the learning engine 110 may be implemented via a general-purpose computer system 20, as shown in FIG. 5, for executing the method 400 by a processor, such as a central processing unit 21 of the computer system 20.

The method 400 begins at step 402 and proceeds to step 404. At step 404, the learning engine 110 updates the frequency database 112 for each file evaluated from the backup sources 1 to N. The method 400 then proceeds to step 406 where the data analysis engine 101 invokes the document evaluation module 102 which evaluates uniqueness for a file from the backup sources 1 to N by comparing the file to frequency database 112. In some instances, the comparison comprises a comparison of hash checks or checksums of the file and respective hash checks or checksums stored in the frequency database 112.

At step 408, the data analysis engine 101 invokes the categorization processor 104 which categorizes the file into a hierarchy of types according to the properties of the file in addition to similarities with previously encountered and analyzed files. The categorization processor 104, as previously discussed, performs deep learning on one or more analysis sources 1 to M so that individual files from a backup source can be categorized and classified quickly and accurately. Then, the method proceeds to step 409 to form the backup strategy for the file in accordance with the uniqueness and the categorization of the file. In other words, the results of steps 406 and 408 are used to form the backup strategy for the file.

The method proceeds to step 410 where the data analysis engine 101 determines a confidentiality of a document. Whether the document should be stored confidentially and whether the degree of confidentiality affects the ultimate backup strategy. If the file does not have a confidentiality greater than a predetermined threshold, the method proceeds to step 414. If the file has a confidentiality greater than the predetermined threshold, the backup strategy is formed with an encryption parameter at step 412 that indicates the file is to be encrypted, along with a degree of confidentiality which is ultimately used to determine which encryption algorithm is used during backup. The method then proceeds to step 414.

At step 414, the data analysis engine 101 determines whether the importance score and/or the uniqueness score, or both in aggregate, of the file are greater than a predetermined threshold. If the scores are greater than the predetermined threshold, the method proceeds to step 416. Otherwise, the method proceeds to step 422. In step 416, the strategy processor 106 adds distributed backup to the backup strategy. In some instances, a local backup is also added to the backup strategy at step 418, for example, when further security is desired.

The method 400 then proceeds to step 422 where the data analysis engine 422 determines whether the file has a criticality score (e.g., RPO 214 of FIG. 2) greater than a predetermined criticality threshold. If so, the method 400 proceeds to step 424 where a distributed backup is added to the backup strategy where a degree of redundancy can be chosen. If the criticality score is lower than the threshold, then the method proceeds step 423 where a local backup is added to the backup strategy.

The method 400 then proceeds to step 426 where the data analysis engine 422 determines whether the file has a recovery time less than a recovery time threshold. If so, the method 400 proceeds to step 428 where an instant backup is added to the backup strategy.

The method then proceeds to step 430 where the strategy processor 430 performs the backup operation using the added backup strategies. This process is repeated for each file, thus a fully formed backup strategy contains strategies for all file/file types in the backup sources 1 to N. The method 400 terminates at step 440.

FIG. 5 is a block diagram illustrating a general-purpose computer system 20 on which aspects of systems and methods for automating formation and execution of a backup strategy may be implemented in accordance with an exemplary aspect of the disclosure. It should be noted that the computer system 20 can correspond to the system 100, data analysis engine 101, or learning engine 110, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. . . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for forming and executing a backup strategy comprising:
   for each file of files from one or more data sources that is being evaluated to form the backup strategy for the file, updating, by a processor, a frequency database;
   evaluating, by the processor, a uniqueness for the file stored at a data source of the one or more data sources by comparing at least a portion of data of the file to the frequency database;
   forming, by the processor, the backup strategy for the file, wherein the forming further comprises:
      adding a secure backup strategy to the backup strategy for the file, when the uniqueness or importance of the portion of data is determined as being greater than a respective predetermined uniqueness or importance threshold;
      adding, by the processor, an instant copying to the backup strategy for the file, when the file is determined as having a desired recovery time less than a predetermined recovery time threshold;
      copying the file to a cloud storage, when the instant copying is added to the backup strategy;
      adding a distributed backup to the backup strategy for the file, when a criticality of data loss associated with the portion of data is higher than a predetermined criticality threshold; and
      adding a local backup to the backup strategy for the file, when the criticality of data loss associated with the portion of data is lower than the predetermined criticality threshold; and
   executing, by the processor, the backup strategy for the file.

2. The method of claim 1, further comprising:
   categorizing, by the processor, the file into a hierarchy of logical types according to properties of the file by:
      analyzing metadata associated with the file;
      analyzing contents of the file; and
      classifying the file based on the metadata associated with the file and the contents of the file; and
   wherein forming the backup strategy for the file is further according to the categorization of the file.

3. The method of claim 1, further comprising:
   evaluating a confidentiality of a file prior to forming the backup strategy, the evaluation being to determine whether the file is confidential and, when the file is confidential, to determine a degree of confidentiality; and
   selecting a strength of one or more encryption algorithms according to the determined degree of confidentiality.

4. The method of claim 1, the backup strategy further being formed according to one or more of: an importance, a recovery time, and a recovery point objective of the file.

5. The method of claim 1, wherein the uniqueness is evaluated based on a deep learning analysis of one of: a local data set and an external data set, wherein the local data set comprises an archive and the external data set comprises the Internet.

6. The method of claim 5, wherein the evaluation of the uniqueness based on the deep learning comprises one or more of: considering an authorship of the file, considering metadata regarding a location of the file in combination with the authorship of the file, and considering an availability of the file in the local and external data sets.

7. A system for forming and executing a backup strategy, comprising:
   at least one processor configured to:
      for each file of files from one or more data sources that is being evaluated to form the backup strategy for the file, update a frequency database, evaluate a uniqueness for the file stored at a data source of the one or more data sources by comparing at least a portion of data of the file to the frequency database, form the backup strategy for the file by:
  adding a secure backup strategy to the backup strategy for the file, when the uniqueness or importance of the portion of data is determined as being greater than a respective predetermined uniqueness or importance threshold;
  adding an instant copying to the backup strategy for the file, when the file is determined as having a desired recovery time less than a predetermined recovery time threshold;
  copying the file to a cloud storage, when the instant copying is added to the backup strategy;
  adding a distributed backup to the backup strategy for the file, when a criticality of data loss associated with the portion of data is higher than a predetermined criticality threshold; and
  adding a local backup to the backup strategy for the file, when the criticality of data loss associated with the portion of data is lower than the predetermined criticality threshold; and
execute the backup strategy for the file.

8. The system of claim 7, wherein the processor is further configured to:
categorize the file into a hierarchy of logical types according to properties of the file by:
  analyzing metadata associated with the file,
  analyzing contents of the file, and
  classifying the file based on the metadata associated with the file and the contents of the file; and
wherein forming the backup strategy for the file is further according to the categorization of the file.

9. The system of claim 7, the processor further being configured to:
evaluate a confidentiality of a file prior to forming the backup strategy, the evaluation being to determine whether the file is confidential, and when the file is confidential, determine a degree of confidentiality; and
select a strength of one or more encryption algorithms according to the determined degree of confidentiality.

10. The system of claim 7, the processor being further configured to form the backup strategy according to one or more of: an importance, a recovery time, and a recovery point objective of the file.

11. The system of claim 7, wherein the uniqueness is evaluated based on a deep learning analysis of one of: a local data set and an external data set, the local data set comprising an archive and the external data set comprising the Internet.

12. The system of claim 11, wherein the evaluation of the uniqueness based on the deep learning comprises one or more of: considering an authorship of the file and availability of the file in the local and external data sets, considering metadata regarding a location of the file in combination with the authorship of the file, and considering an availability of the file in the local and external data sets.

13. A non-transitory computer readable medium storing thereon computer executable instructions for forming and executing backup strategies, including instructions for:
for each file of files from one or more data sources that is being evaluated to form the backup strategy for the file, updating a frequency database;
evaluating a uniqueness for the file stored at a data source of the one or more data sources by comparing at least a portion of data of the file to the frequency database;
forming the backup strategy for the file, wherein the forming further comprises:
  adding a secure backup strategy to the backup strategy for the file, when the uniqueness or importance of the portion of data is determined as being greater than a respective predetermined uniqueness or importance threshold;
  adding an instant copying to the backup strategy for the file, when the file is determined as having a desired recovery time less than a predetermined recovery time threshold;
  copying the file to a cloud storage, when the instant copying is added to the backup strategy;
  adding a distributed backup to the backup strategy for the file, when a criticality of data loss associated with the portion of data is higher than a predetermined criticality threshold; and
  adding a local backup to the backup strategy for the file, when the criticality of data loss associated with the portion of data is lower than the predetermined criticality threshold; and
executing the backup strategy for the file.

14. The non-transitory computer readable medium of claim 13, the instructions further including instructions for:
categorizing the file into a hierarchy of logical types according to properties of the file by:
  analyzing metadata associated with the file;
  analyzing contents of the file; and
  classifying the file based on the metadata associated with the file and the contents of the file; and
wherein forming the backup strategy for the file is further according to the categorization of the file.

15. The non-transitory computer readable medium of claim 13, the instructions further including instructions for:
evaluating a confidentiality of a file prior to forming the backup strategy, the evaluation being to determine whether the file is confidential, and when the file is confidential, to determine a degree of confidentiality; and
selecting a strength of one or more encryption algorithms according to the determined degree of confidentiality.

* * * * *